United States Patent [19]

Smith

[11] Patent Number: 4,734,451

[45] Date of Patent: Mar. 29, 1988

[54] SUPERCRITICAL FLUID MOLECULAR SPRAY THIN FILMS AND FINE POWDERS

[75] Inventor: Richard D. Smith, Richland, Wash.

[73] Assignee: Battelle Memorial Institute, Richland, Wash.

[21] Appl. No.: 839,079

[22] Filed: Mar. 12, 1986

Related U.S. Application Data

[63] Continuation-in-part of Ser. No. 528,723, Sep. 1, 1983, Pat. No. 4,582,731.

[51] Int. Cl.[4] .......................... B01D 15/08; B29B 9/00; C08K 3/34; C08L 27/12

[52] U.S. Cl. .......................... 524/493; 210/656; 264/12; 525/545; 525/546; 118/300; 118/308

[58] Field of Search .............. 118/300, 308; 210/658, 210/696; 264/12; 427/421, 190, 189, 193, 195, 200, 206; 428/336; 524/493, 545, 546

[56] References Cited

U.S. PATENT DOCUMENTS

| | | | |
|---|---|---|---|
| 3,765,922 | 10/1973 | Chisholm | 427/200 |
| 3,981,957 | 9/1976 | van Brederode et al. | 264/12 X |
| 4,004,176 | 1/1977 | Otake et al. | 427/193 X |
| 4,012,461 | 3/1977 | van Brederode | 264/12 X |
| 4,150,995 | 4/1979 | Moritsu et al. | 427/193 X |
| 4,460,637 | 7/1984 | Miyamoto et al. | 428/336 X |
| 4,590,119 | 5/1986 | Kawakami et al. | 428/336 X |

OTHER PUBLICATIONS

Johnson, Otto H., *Germanium and Its Inorganic Compounds*, 7/21/52, pp. 431, 443–447.

V. J. Krukonis, Supercritical Fluid Nucleation of Difficult-to-Comminute Solids, presented at 1984 meeting, AIChE, San Francisco, Nov. 25–30, 1984, and published Nov. 1985.

*Primary Examiner*—Michael R. Lusignan

*Attorney, Agent, or Firm*—Marger & Johnson

[57] ABSTRACT

Solid films are deposited, or fine powders formed, by dissolving a solid material into a supercritical fluid solution at an elevated pressure and then rapidly expanding the solution through a short orifice into a region of relatively low pressure. This produces a molecular spray which is directed against a substrate to deposit a solid thin film thereon, or discharged into a collection chamber to collect a fine powder. The solvent is vaporized and pumped away. Solution pressure is varied to determine, together with flow rate, the rate of deposition and to control in part whether a film or powder is produced and the granularity of each. Solution temperature is varied in relation to formation of a two-phase system during expansion to control porosity of the film or powder. A wide variety of film textures and powder shapes are produced of both organic and inorganic compounds. Films are produced with regular textural feature dimensions of 1.0–2.0 μm down to a range of 0.01 to 0.1 μm. Powders are formed in very narrow size distributions, with average sizes in the range of 0.02 to 5 μm.

21 Claims, 28 Drawing Figures

FIG. 5A
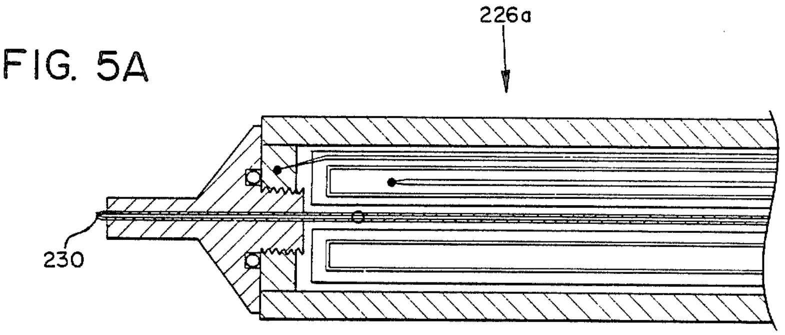
FIG. 5
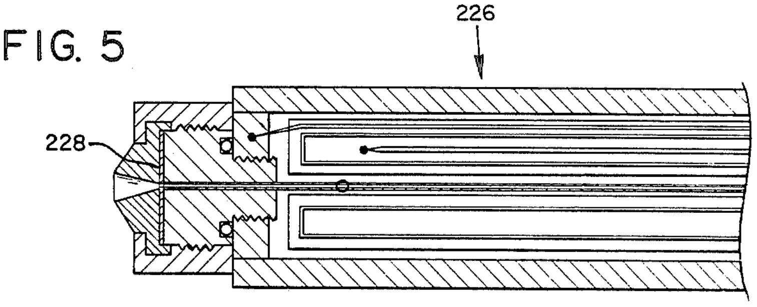
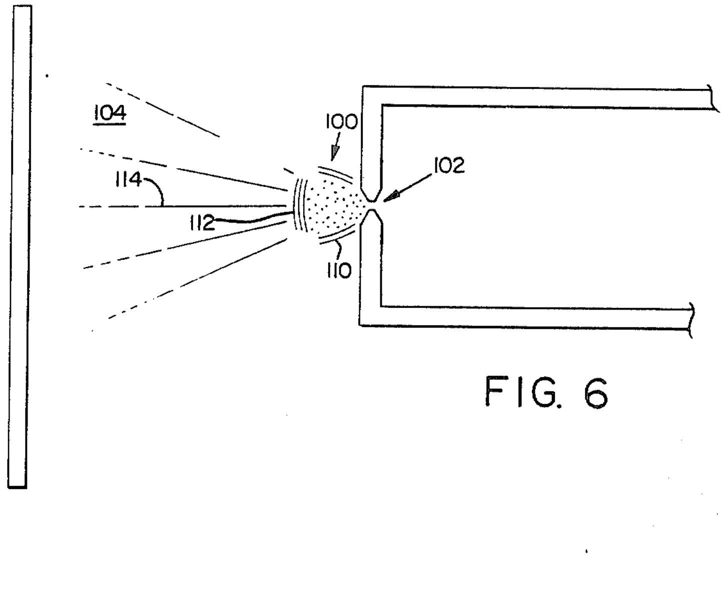
FIG. 6

EXAMPLES OF FIMS DEPOSITED SURFACES

1 μm

EXAMPLES OF FIMS DEPOSITED PARTICLES

EXAMPLES OF FIMS DEPOSITED PARTICLES

SUPERCRITICAL FLUID MOLECULAR SPRAY THIN FILMS AND FINE POWDERS

RELATED APPLICATION DATA

This is a continuation-in-part of my copending application entitled SUPERCRITICAL FLUID MOLECULAR SPRAY FILM DEPOSITION AND POWDER FORMATION, Ser. No. 528,723, filed Sept. 1, 1983, now U.S. Pat. No. 4,582,731, patented Apr. 15, 1986.

BACKGROUND OF THE INVENTION

This invention relates to deposition and powder formation methods and more particularly to thin films and fine powders.

Thin films and methods for their formation are of crucial importance to the development of many new technologies. Thin films of less than about one micrometer (μm) thickness down to those approaching monomolecular layers, cannot be made by conventional liquid spraying techniques. Liquid spray coatings are typically more than an order of magnitude thicker than true thin films. Such techniques are also limited to deposition of liquid-soluble substances and subject to problems inherent in removal of the liquid solvent.

There are many existing technologies for thin films deposition, including physical and chemical vapor deposition, plasma pyrolysis and sputtering. Collectively, these techniques are usable to produce thin films of many materials for a wide variety of applications, but it is still impossible to generate suitable thin films of many materials, particularly for thermally labile organic and polymeric materials. Some of these known techniques enable deposition of thin films having physical and chemical qualities, such as molecular homogeneity, which are unattainable by liquid spray techniques. Existing thin film technologies are often also inadequate for many applications due to high power requirements, low deposition rates, limitations upon substrate temperature, or the complexity and expense of deposition equipment. Hence, such techniques cannot be used economically to produce thick films or coatings having the same qualities as thin films.

Accordingly, a need remains for a new surface deposition technique, which has the potential of allowing deposition of thin films not previously possible, with distinct advantages compared to existing thin film technologies.

Similar problems and a similar need exists in the formation of fine powders. Highly homogeneous and very fine powders, such as made by plasma processing, involve a very energy intensive process and are, therefore, expensive to make. Vapor chemical processes are also known for use in making very fine powders (e.g., fumed silica) in down to submicron sizes but are very expensive and also limited to very specific combinations of chemical reactants. Mechanical grinding produces particles of irregular shape and wide variation in size, predominantly in a range of about 10–300 μm and with 1 μm constituting the practical minimum size, although a fraction with smaller particles may be produced (due to the wide distribution). It can also be very costly. Preparation of polymer powders by atomizing from a liquid solution, as disclosed in U.S. Pat. No. 4,012,461 to van Brederode, is limited to liquid-soluble polymers having a decomposition point higher than 100° C. It produces 20–30% agglomerates requiring further reduction to produce a particle size yield of 99% less than 100 μm, a minimum size of about 5 μm, and an average size range of 20–30 μm. Another technique for atomizing a mixture of molten, normally-solid polymer and a liquid solvent, disclosed in U.S. Pat. No. 3,981,957 to van Brederode et al. requires a separate blowing gas, e.g., nitrogen and a two-fluid nozzle. It produces particles of a size on the order of less than 200 μm. When feed temperature is maintained sufficiently high, such particles are substantially spherical. Fibers are produced at lower temperatures.

Neither the foregoing nor any other prior process is known to be able to produce powders in an average size range of 1–3 μm or smaller. Nor are the foregoing processes applicable to non-molten or liquid insoluble materials, e.g., inorganic compounds such as solid silica ($SiO_2$). Moreover, these patents indicate that the powders produced are essentially spherical, which shape provides a minimal surface area. For some applications, e.g., catalytic processes, it is desirable to have fine powders of much greater surface area than provided by spherical powders.

Accordingly, a need also remains for improved methods of forming powders.

SUMMARY OF THE INVENTION

One object of this invention is to enable deposition of very high- as well as low-molecular weight materials as solid thin films or formation of powders thereof.

A second object is to deposit films or from fine powders of thermally-labile compounds.

A third object of the invention is to deposit thin films having a highly homogeneous microstructure.

Another object is to reduce the cost and complexity of apparatus for depositing thin films or forming powders.

A further object is to enable rapid deposition of coatings having thin film qualities.

Another object is the formation of fine powders having a narrow size distribution, and to enable control of their physical and chemical properties as a function of their detailed structure.

An additional object is the formation of fine powders with structures appropriate for use as selective chemical catalysts.

Yet another object is to enable deposition without excessively heating or having to cool or heat the substrate to enable deposition.

An additional object is to enable deposition of nonequilibrium materials.

The invention is a new technique for depositing thin films and forming fine powders utilizing a supercritical fluid injection molecular spray (FIMS). The technique involves the rapid expansion of a pressurized supercritical fluid (dense gas) solution containing the solid material or solute to be deposited into a low pressure region. This is done in such a manner that a "molecular spray" of individual molecules (atoms) of very small clusters of the solute are produced, which may then be deposited as a film on any given substrate or, by promoting molecular nucleation or clustering, as a fine powder. The range of potential application of this new surface deposition and powder formation technology is very broad.

The technique appears applicable to any material which can be dissolved in a supercritical fluid. In the context of this invention, the term "supercritical" relates to dense gas solutions with enhanced solvation powers, and can include near supercritical fluids. While the ultimate limits of application are unknown, it includes most polymers, organic compounds, and many inorganic materials (using, for example, supercritical water as the solvent). Polymers of more than one million molecular weight can be dissolved in supercritical fluids. Thin films and powders can therefore be produced for a wide range of organic, polymeric, and thermally labile materials which are impossible to produce with existing technologies. This technique also provides the basis for improved and considerably more economical methods for forming powders or depositing surface layers of a nearly unlimited range of materials on any substrate and at any desired thickness.

Such films can be made either extremely smooth, regularly cobbled, or with matted, strand-like textures of varying coarseness, uniformly over a substrate surface area, e.g., 4 $cm^2$. Besides thin films, of less than 1 $\mu m$ thickness, the process can also be modified, as described hereinafter, to deposit thick films, of 1 to 5 $\mu m$ thickness directly from the molecular spray onto a surface, for example, to cover a microporous surface. These films can be made either porous or nonporous. By porous films is meant a material layer having a high surface area; nonporous films refer to smooth or nearly smooth coatings with low surface areas.

The FIMS film deposition and powder formation processes are useful for many potential applications and can provide significant advantages over prior techniques. For example, in the electro-optic materials area, improved methods of producing thin organic and polymer films are needed and are made possible by this invention. The process also appears to be useful for the development of resistive layers (such as polyimides) for advanced microchip development. These techniques can provide the basis for thin film deposition of materials for use in molecular scale electronic devices where high quality films of near molecular thicknesses will be required for the ultimate step in miniaturization. This approach also provides a method for deposition of thin films of conductive organic compounds as well as the formation of thin protective layers. A wide range of applications exist for deposition of improved coatings for UV and corrosion protection, and layers with various specialized properties. Many additional potential applications could be listed. Similarly, FIMS powder formation techniques can be used for formation of more selective catalysts or new composite and low density materials with a wide range of applications.

The same basic method can be used to make powders of both organic and inorganic compounds. Powders can be made in a wide range of textures, depending on the material, including nearly spherical powders, strand-like elongated powders, and microporous or high surface area, amorphous powders, all in a very narrow range of uniform size and shape. Moreover, such powders can be made in most instances in narrow size ranges with average particle sizes one to two orders of magnitude smaller than prior powders.

It is believed that this process will have substantial utility in space manufacturing applications, particularly using the high-vacuum, low-gravity conditions thereof. In space, this process would produce perfectly symmetric powders. Applications in space as well as on earth include deposition of surface coatings of a wide range of characteristics, and deposition of very thin adhesive layers for bonding and construction.

There are three fundamental aspects to the FIMS film deposition and powder formation process. The first aspect pertains to supercritical fluid solubility. Briefly, many solid materials of interest are soluble in supercritical fluid solutions that are substantially insoluble in liquids or gases. Forming a supercritical solution can be accomplished either of two ways: dissolving a solute or appropriate precursor chemicals into a supercritical fluid or dissolving same in a liquid and pressurizing and heating the solution to a supercritical state. In accordance with the invention, the supercritical solution parameters—temperature, pressure, and solute concentration—are varied to control rate of deposition and molecular nucleation or clustering of the solute.

The second important aspect is the fluid injection molecular spray or FIMS process itself. The injection process involves numerous parameters which affect solvent cluster formation during expansion, and a subsequent solvent cluster "break-up" phenomenon in a Mach disk which results from free jet or supersonic expansion of the solution. Such parameters include expansion flow rate, orifice dimensions, expansion region pressures and solvent-solute interactions at reduced pressures, the kinetics of gas phase nucleation processes, cluster size and lifetime, substrate conditions, and the energy content and reactivity of the "nonvolatile" molecules which have been transferred to the gas phase by the FIMS process. Several of these parameters are varied in accordance with the invention to control solvent clustering and to limit or promote nucleation of the solute molecules selectivity to deposit films or to form powders, respectively, and to vary granularity and other characteristics of the films or powders. Moreover, temperature of the supercritical solution can be controlled in relation to the two-phase temperature of the solution to control specific physical characteristics of a film or powder produced by the FIMS process, such as porosity or exposed surface area.

The third aspect of the invention pertains to the conditions of the substrate during the thin film deposition process. Briefly, all of the techniques presently available to the deposition art can be used in conjunction with this process. In addition, a wide variety of heretofor unavailable physical film characteristics can be obtained by varying the solution and fluid injection parameters in combination with substrate conditions.

The potential major advantages of the FIMS thin film deposition technique compared to conventional technologies such as sputtering and chemical vapor deposition (CVD) include:

Economic operation (compared to sputtering).

A wide range of readily controlled deposition rates.

Operation from high vacuum to atmospheric pressures.

Independence from substrate conditions and limitations (such as temperature) allowing improved control over film characteristics.

Deposition of organic and polymeric materials in thin films not possible by existing technologies.

Possible adaptation to small portable deposition devices for exotic applications.

Similar advantages arise from the FIMS powder formation method, in particular the ability to generate ultra fine powders, highly uniform size distributions, and uniform or amorphous chemical and physical properties.

The foregoing and other objects, features and advantages of the invention will become more readily apparent from the following detailed description, which proceeds with reference to the accompanying drawings.

BRIEF DESCRIPTION OF THE DRAWINGS

FIGS. 5 and 5A are enlarged cross sectional views of two different forms of supercritical fluid injectors used in the apparatus of FIG. 4.

FIG. 6 is a schematic illustration of the fluid injection molecular spray process illustrating the interaction of the supercritical fluid spray with the low pressure region into which it is injected.

DETAILED DESCRIPTION

The immediately following sections describe, in turn, the relevant aspects of supercritical fluid behavior, the FIMS process, and film deposition and powder formation using the process. These are followed by descriptions of apparatus used in the process and examples of the process and the resultant products. Various background references are cited parenthetically in this description, are listed in the appended bibliography and are incorporated by reference herein to further explain to practitioners of the thin film deposition and powder formation arts certain details of the present invention with which they presently are not ordinarily familiar.

Solubilities in Supercritical Fluids

The primary requirement for the Fluid Injection Molecular Spray (FIMS) technique is that the material to be deposited (or a suitable precursor) be soluble in a supercritical fluid. Subsequently in the process, the supercritical fluid or solvent is one which substantially vaporizes into a gas upon expansion from the supercritical state, enabling removal from the vicinity of deposition.

Because of its importance to the FIMS powder and film deposition technique, and the present lack of solubility data for many substances of interest, a brief discussion of relevant supercritical fluid phenomena is warranted.

At high pressures above the critical point the resulting fluid or "dense gas" will attain densities approaching those of a liquid (with increased intermolecular interactions) and will assume some of the properties of a liquid. The supercritical fluid extraction (1) and supercritical fluid chromatography (2) methods utilize the variable but readily controlled properties characteristic of a supercritical fluid. These properties are dependent upon the fluid composition, temperature, and pressure.

Figure 1:
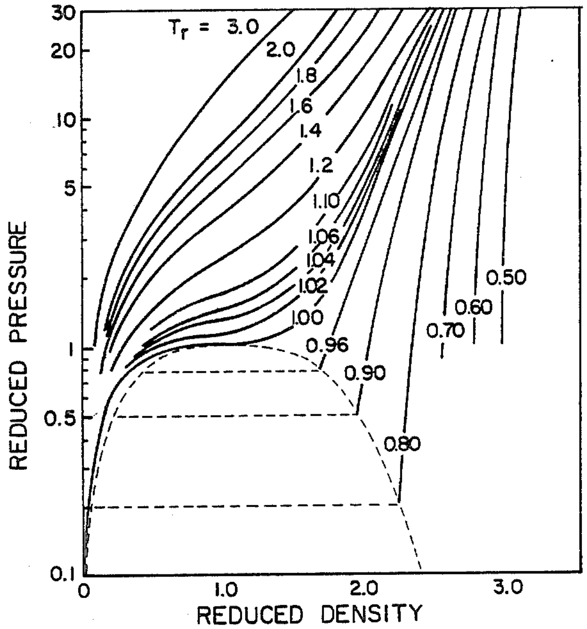
FIG. 1 is a graph of a typical pressure-density behavior for a compound in the critical region in terms of reduced parameters.

The compressibility of supercritical gases is great, just above the critical temperature where small changes in pressure result in large changes in the density of the supercritical fluid (3). FIG. 1 shows a typical pressure-density relationship in terms of reduced parameters (e.g., pressure, temperature or density divided by the corresponding variable at the critical point, which are given for a number of compounds in Table 1). Isotherms for various reduced temperatures show the variations in density which can be expected with changes in pressure. The "liquid-like" behavior of a supercritical fluid at higher pressures results in greatly enhanced solubilizing capabilities compared to those of the "subcritical" gas, with higher diffusion coefficients and an extended useful temperature range compared to liquids (4). Compounds of high molecular weight can often be dissolved in the supercritical phase at relatively low temperatures; and the solubility of species up to 1,800,000 molecular weight has been demonstrated for polystyrene.

An interesting phenomenon associated with supercritical fluids is the occurrence of a "threshold pressure" for solubility of a high molecular weight solute (4). As the pressure is increased, the solubility of the solute will often increase by many orders of magnitude with only a small pressure increase (2). Thus, the threshold pressure is the pressure (for a given temperature) at which the solubility of a compound increases greatly (i.e., becomes detectable). Examples of a few compounds which can be used as supercritical solvents are given in Table 1.

TABLE 1

EXAMPLES OF SUPERCRITICAL SOLVENTS

| Compound | Boiling Point (°C.) | Critical Temperature (°C.) | Critical Pressure (atm) | Critical Density ($g/cm^3$) |
|---|---|---|---|---|
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Benzene | 80.1 | 288.9 | 48.3 | 0.302 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | 31.2 | 28.0 | 38.7 | 0.579 |
| Monofluoromethane | 78.4 | 44.6 | 58.0 | 0.3 |
| Toluene | 110.6 | 320.0 | 40.6 | 0.292 |
| Pyridine | 115.5 | 347.0 | 55.6 | 0.312 |
| Cyclohexane | 80.74 | 280.0 | 40.2 | 0.273 |
| m-Cresol | 202.2 | 433.0 | 45.0 | 0.346 |
| Decalin | 195.65 | 391.0 | 25.8 | 0.254 |
| Cyclohexanol | 155.65 | 356.0 | 38.0 | 0.273 |
| o-Xylene | 144.4 | 357.0 | 35.0 | 0.284 |
| Tetralin | 207.57 | 446.0 | 34.7 | 0.309 |
| Aniline | 184.13 | 426.0 | 52.4 | 0.34 |

Near supercritical liquids demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some compounds. These variations are considered to be within the concept of a supercritical fluid as used in the context of this invention.

The fluid phase solubility of higher molecular weight and more polar materials is a necessary prerequisite for many potentially important FIMS applications. Unfortunately, the present state of theoretical prediction of fluid phase solubilities is inadequate to serve as a reliable guide to fluid selection. Various approaches to solubility prediction have been suggested or employed. Some of these approaches have been reviewed by Irani and Funk (5). The rigorous theoretical approach is to use the virial equation-of-state and calculate the necessary virial coefficients using statistical mechanics. However, the virial equation-of-state does not converge as the critical density is approached (5). Since its application is generally limited to densities of less than half the critical density, it is inadequate for FIMS conditions. Consequently, at higher solvent densities, an empirical or semi-empirical equation-of-state must be employed. While both equations-of-state and lattice gas models have been applied to fit supercritical fluid solubility data (6–13), this approach at present is of limited value for polar components and larger organic compounds (14,15).

An alternative approach which uses the more empirically derived solubility parameters can be modified to be an appropriate guide for fluid selection (16,17). This approach has the advantage of simplicity, but necessarily involves approximations due to an inadequate treatment of density-dependent entropy effects, pressure-volume effects, and other approximations inherent in solution theory, as well as failures such as those noted for the theoretical methods. More recent approaches, designed to take into consideration the range of attractive forces, have utilized multidimensional solubility parameters which are evaluated by more empirical methods (18). In contrast to liquids, the solubility parameter of a supercritical fluid is not a constant value, but is approximately proportional to the gas density. In general, two fluid components are considered likely to be mutually soluble if the component solubility parameters agree to within ±1 ($cal/cm^3$). However, actual supercritical fluid solubilities are usually less than predicted (17). The solubility parameter may be divided into two terms related to "chemical effects" and intermolecular forces (16,17). This approach predicts a minimum density below which the solute is not soluble in the fluid phase (the "threshold pressure"). It also suggests that the solubility parameter will have a maximum value as density is increased if sufficiently high solubility parameters can be obtained. This phenomenon has been observed for several compounds in very high pressure studies (17).

Figures 2, 4:
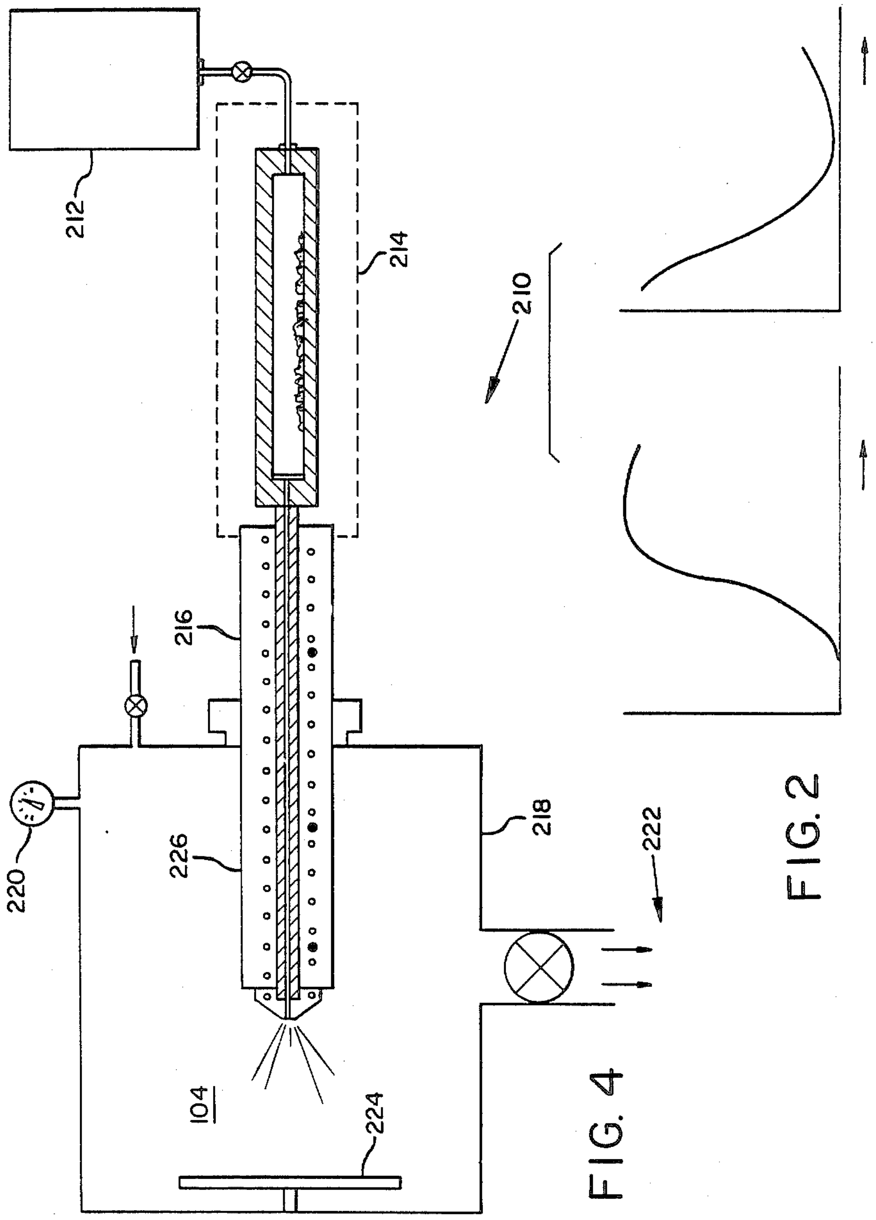
FIG. 2 is a graph of typical trends for solubilities of solids in supercritical fluids as a function of temperature and pressure.
FIG. 4 is a simplified schematic of apparatus for supercritical fluid injection molecular spray deposition of thin films on a substrate or formation of powders in accordance with the invention.

The typical range of variation of the solubility of a solid solute in a supercritical fluid solvent as a function of temperature and pressure is illustrated in a simplified manner in FIG. 2. The solute typically exhibits a threshold fluid pressure above which solubility increases significantly. The region of maximum increase in solubility has been predicted to be near the critical pressure where the change in density is greatest with pressure (see FIG. 1) (18). In contrast, where volatility of the solute is low and at lower fluid pressures, increasing the temperature will typically decrease solubility as fluid density decreases. However, as with many liquids, "solubility" may again increase at sufficiently high temperatures, where the solute vapor pressure may also become significant. Thus, while the highest supercritical fluid densities at a given pressure are obtained near the critical temperature, higher solubilities may be obtained at slightly lower fluid densities but higher temperatures.

Figure 3:
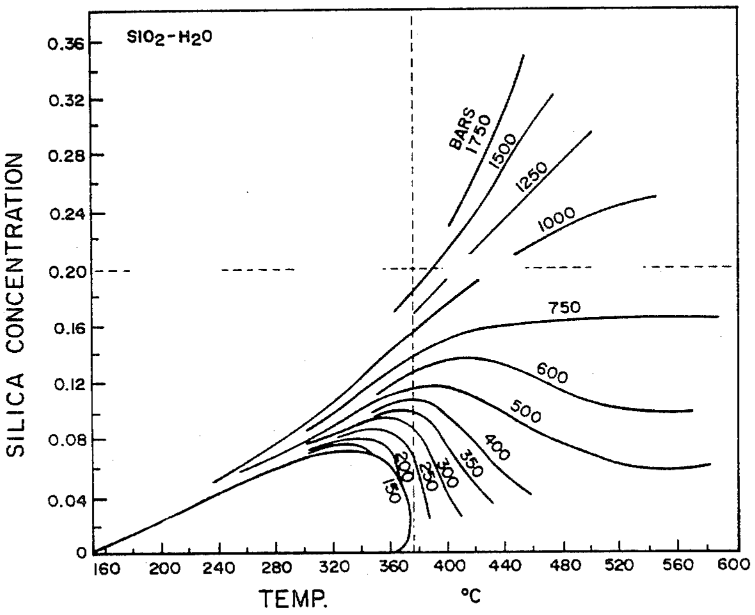
FIG. 3 is a graph of the solubility of silicon dioxide ($SiO_2$) in subcritical and supercritical water at various pressures.

While there is little data concerning the solubility of many materials relevant to FIMS film deposition, some systems have been extensively investigated due to their importance in other fields of technology (19–23). As an example, FIG. 3 gives solubility data for silicon dioxide ($SiO_2$) in subcritical and supercritical water, illustrating the variation in solubility with pressure and temperature. The variation in solubility with pressure provides a method for both removal or reduction in impurities, as well as simple control of FIMS deposition rate. Other possible fluid systems include those with chemically-reducing properties, or metals, such as mercury, which are appropriate as solvents for metals and other solutes which have extremely low vapor pressures. Therefore, an important aspect of the invention is the utilization of the increased supercritical fluid solubilities of solid materials for FIMS film deposition and powder formation.

Fluid Injection Molecular Spray

The fundamental basis of the FIMS surface deposition and powder formation process involves a fluid expansion technique in which the net effect is to transfer a solid material dissolved in a supercritical fluid to the gas phase at low (i.e., atmospheric or subatmospheric) pressures, under conditions where it typically has a negligible vapor pressure. This process utilizes a fluid injection technique which calls for rapidly expanding the supercritical solution through a short orifice into a relatively lower pressure region, i.e., one of approximately atmospheric or subatmospheric pressures. This technique is akin to an injection process, the concept of which I recently developed, for direct analysis of supercritical fluids by mass spectrometry (24–28). However, it differs from the spectrometry application in that the latter is limited to expansion into regions of well-defined pressure of about 1 torr., very low flow rates—less than about 100 microliters/min.—and very dilute solute concentrations, and injection into an ion plasma, rather than an energetically passive low-pressure region. An understanding of the physical and chemical phenomena during the FIMS process is vital to the deposition of films and formation of films with desirable properties.

The design of the FIMS orifice (or pressure restrictor) is a critical factor in overall performance. The FIMS apparatus should be simple, easily maintained and capable of prolonged operation without failure (e.g., plugging of the restrictor). Additionally, the FIMS process for thin film applications must be designed to provide for control of solute clustering or nucleation, minimization of solvent clusters, and to eliminate or reduce the condensation or decomposition of nonvolatile or thermally labile compounds. Similarly, solute clustering, nucleation and coagulation are utilized to control the formation of fine powders using the FIMS process. The ideal restrictor or orifice allows the entire pressure drop to occur in a single rapid step so as to avoid the precipitation of nonvolatile material at the orifice. Proper design of the FIMS injector, discussed hereinafter, allows a rapid expansion of the supercritical solution, avoiding the gas-to-liquid phase transition.

The unique characteristics of the FIMS process, as contrasted to deposition by liquid spray or nebulization, center about the direct fluid injection process. In liquid nebulization the bulk of the spray is initially present as droplets of about micron size or larger. Droplets of this size present the problem of providing sufficient heat to evaporate the solvent. This is impractical in nearly all cases. Thus spray and nebulization methods are not true thin film techniques since relatively large particles or agglomerations of molecules actually impact the surface. These same characteristics also enable the production of much finer powders using FIMS than are practical by techniques not involving gas phase particle growth.

These characteristics also distinguish the FIMS process and its resultant products, from the processes and products disclosed in U.S. Pat. Nos. 3,981,957 to van Brederode et al. and 4,012,461 to van Brederode. Neither of these patents suggests applicability to coating processes and the deposition of thin films appears to be foreclosed by the large particle sizes as well as the methods employed to precipitate and collect the particles. Both patents disclose making spherical polymer powders. Neither of them discloses manufacture of powders of less than 5 $\mu m$ in diameter (e.g., 1–3 $\mu m$ and smaller, down to the 0.02–0.3 $\mu m$ range), of inorganic compounds, of porous or amorphous particles, or of other nonspherical shapes.

Additional advantages result from the much higher volatility of many supercritical fluids compared to liquid spray or nebulization techniques. This allows the solvent to be readily pumped away or removed since there is little tendency to accumulate on the surface. Typical conditions in the liquid spray or nebulization techniques result in extensive cluster formation and persistence of a jet of frozen droplets into the low pressure discharge region. A characteristic of the FIMS process is that, during fluid injection, there is no visible jet formation once the critical temperature has been exceeded at low flow rates. At high flow rates, for an adiabatic process, a visible expansion process is observed only in the two-phase region.

Figure 3A:
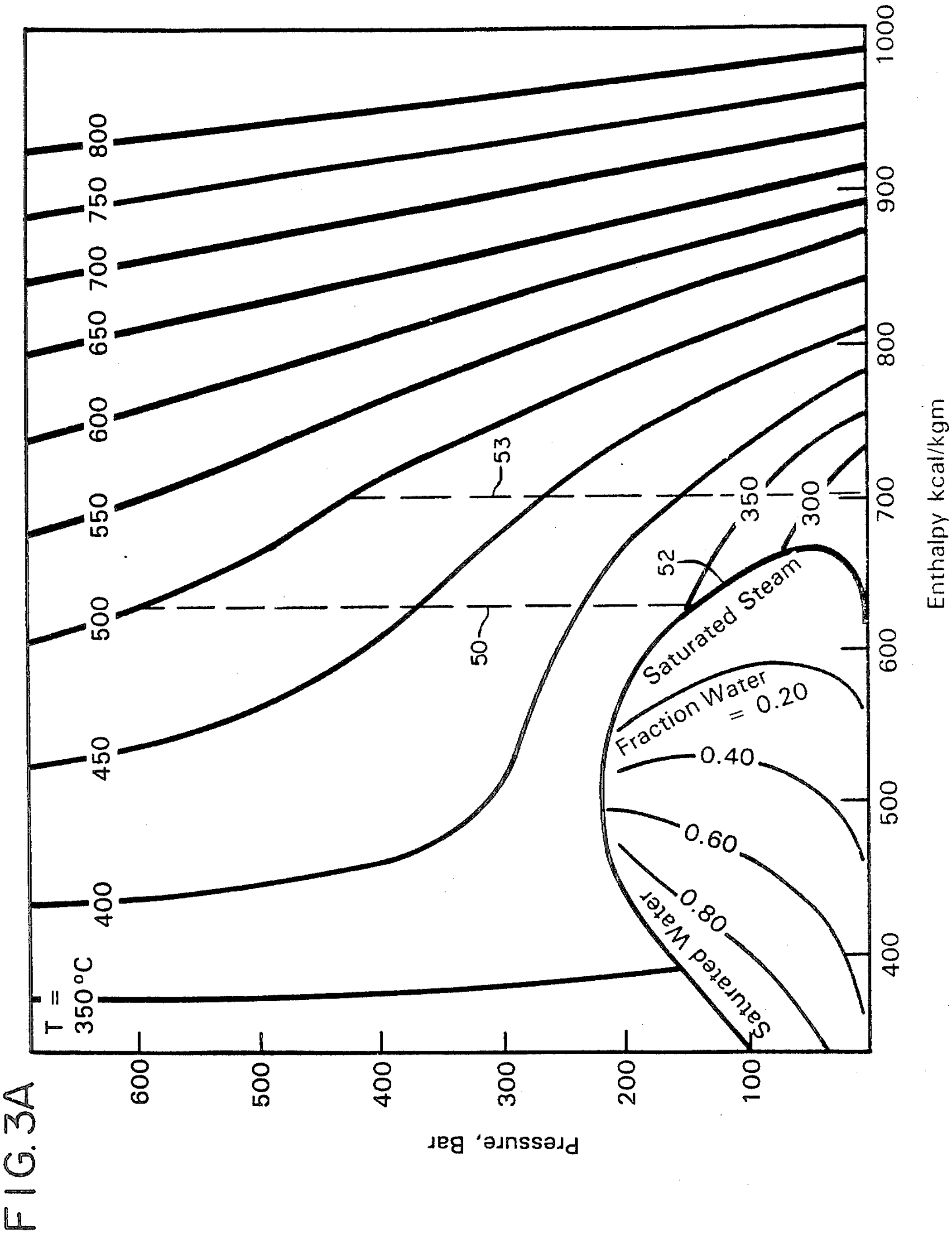
FIG. 3A is a pressure/enthalpy diagram for supercritical water showing examples of the supercritical fluid expansion process by dashed lines.
Figure 3B:
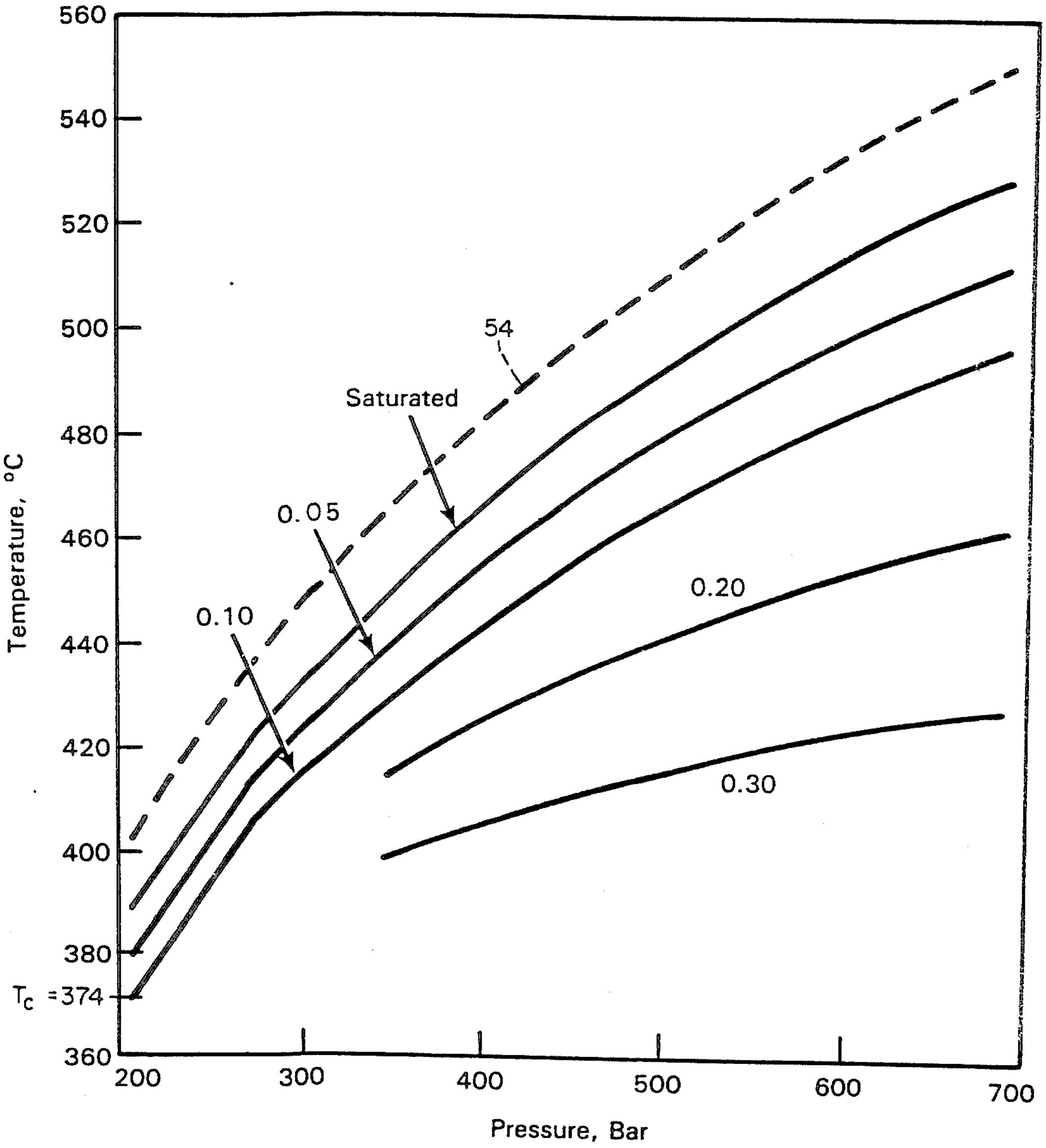
FIG. 3B is a pressure/temperature diagram for supercritical water defining, by a dashed curve, a range of temperatures and pressures for which an isenthalpic expansion avoids traversing a two-phase region for the pure solvent.
Figure 3C:
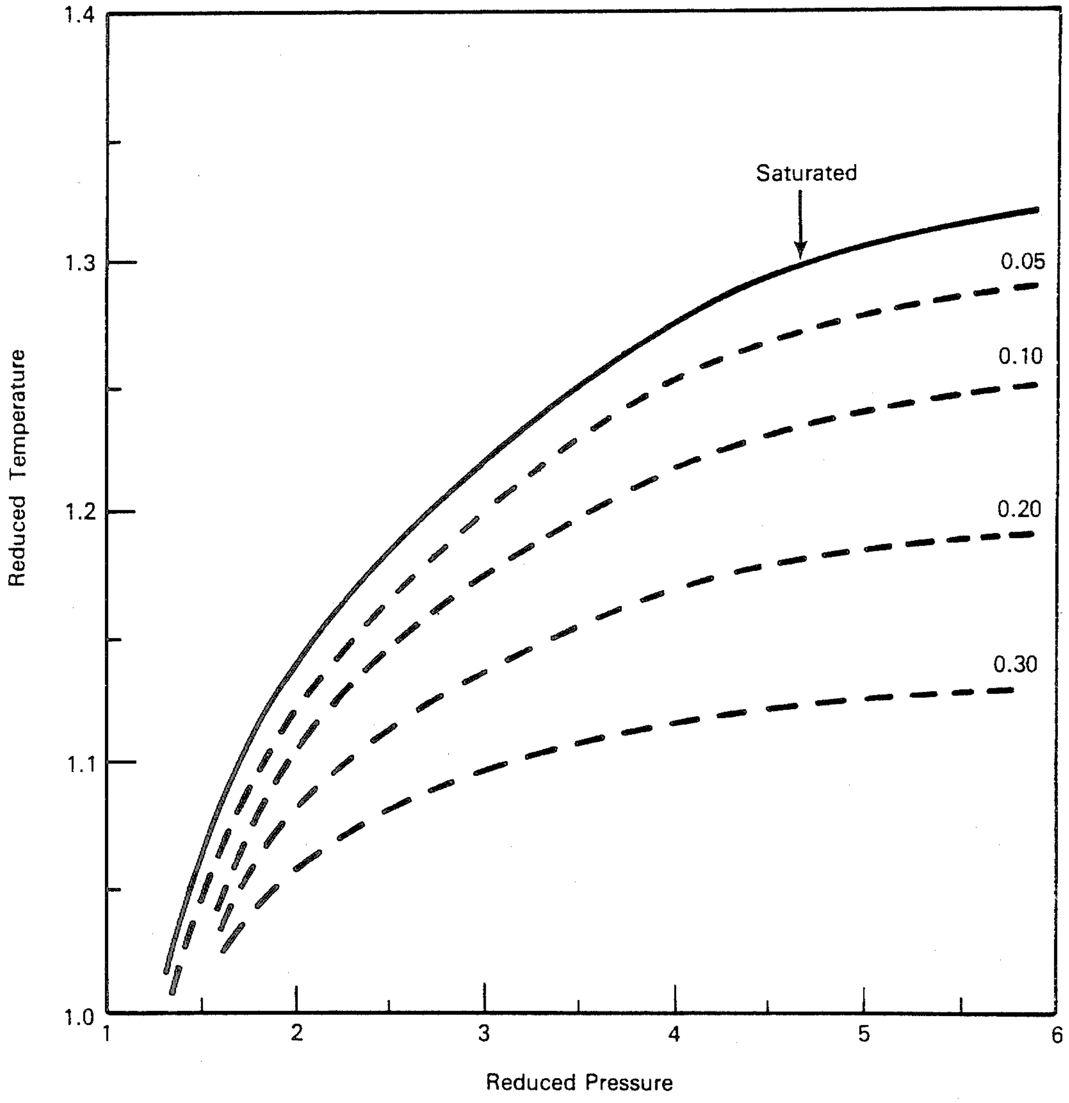
FIG. 3C is a generalized reduced temperature-pressure diagram for a solvent in the critical region.

At normal FIMS operating pressures, i.e., about three times critical pressure, for reduced temperatures (FIG. 1) below approximately 1.3 (corresponding to approximately to $T=568°$ C. at 750 bar for water on FIG. 3B) Tr, a two-phase region can be produced, and the jet will become visible. Referring to FIG. 3C, this principle can be generalized to all supercritical solvents in predicting a threshold between two-phase and single-phase regions for a supercritical solution, which can be further refined by routine experimentation including observation for a visible jet.

Thermodynamic considerations for an isentropic expansion, such as the FIMS process, lead one to expect less than a few percent of the solvent to be initially present as clusters. Proper control of conditions during the FIMS process results in an extremely short lifetime for these small clusters. Solvent clusters are rapidly reduced in size due to both evaporation and by the heating process due to the Mach disk shock front, described below. Clusters or small particles of the "solute" can be avoided by having sufficiently dilute supercritical solutions, operating in a temperature range above the critical temperature for the solvent, and expanding under conditions which minimize the extent of nucleation or agglomeration. On the other hand, small solute particle or powder formation can be maximized by having high solute concentrations and injection flow rates leading to both clusters with large numbers of solute molecules and increased gas phase nucleation and coagulation processes. The latter conditions can produce a fine powder, having a relatively narrow size distribution, with many applications in materials technologies.

Moreover, the temperature of the supercritical solution can be varied to control whether the solvent is single-phase (i.e., a gas) or two-phase (i.e., gas plus liquid) during or after expansion, and thereby determine physical characteristics of the resultant film or powder. FIG. 3A illustrates an example of the FIMS process on a pressure-enthalpy diagram for supercritical water. The supercritical fluid expansion process is close to isenthalpic; i.e., drops along a nearly vertical line on the diagram. When conditions involve expansion from less than about 500° C. and 600 atmospheres for pure water, for example, as illustrated by dashed line 50, the expansion process intersects a two-phase region to the left of and below curve 52. This intersection of a two-phase region for supercritical solutions often corresponds to formation of products with low surface areas (i.e., less porous powders and films) and to thick film (1–5 $\mu m$) formation. (The temperature required to avoid the two-phase region for supercritical solutions will be the same as for the pure solvent for very dilute solutions and deviate to either higher or lower temperatures as solute concentration increases. Thus, until improved thermodynamics and kinetic data is available, experimental determination of this temperature is required for more concentrated solutions.) Conversely, for enthalphy conditions that avoid the two-phase region, for example, expansion along dashed line 53, surface area of the products can increase tremendously, as illustrated in the examples which follow. FIG. 3B shows the process on a temperature-pressure diagram. The region above dashed curve 54 defines the range of temperatures and pressures for which an isenthalpic expansion avoids traversing a two-phase region for the pure solvent.

Referring back to FIG. 3A, an expansion along a vertical line (not shown) midway between dashed lines 50 and 53 (i.e., at about 650 kcal/kgm) passes briefly through two-phase region 52 but then reenters the single phase region. This occurs because, for water, line 52 curves back toward the pressure axis as the expansion approaches the enthalpy axis. This characteristic yields a threshold which is not a single temperature but a range of temperatures falling, in FIG. 3B, between dashed lines 54 and the saturated line. Expanding, from above line 54, e.g., along line 53 in FIG. 3A clearly yields a single phase expansion. Similarly, expansion from a temperature/pressure below the saturated line in FIG. 3B, e.g., along line 50, clearly yields a two-phase expansion. For many solvents other than water, the line corresponding to line 52 is not inflected back toward the pressure axis. Thus, for these solvents, the threshold between single and two-phase expansion is narrower, so that in the generalized graph of FIG. 3C, the saturated curve also defines the threshold between a single and two-phase expansion.

While passage through a two-phase region qualitatively corresponds to formation of less porous powder and thick film production under otherwise constant conditions, other parameters may alter the expansion process and resultant products. As nozzle design changes, one process may be closer to isenthalpic than another. The thermodynamics of the process can also be affected by solute variations as noted above. Thus, the temperature for formation of a nonporous product can vary from case to case. Nevertheless, the threshold temperature can be determined by routine experimentation.

An improved understanding of the FIMS process may be gained by consideration of solvent cluster formation phenomena during isentropic expansion of a high pressure jet 100 through a nozzle 102, as illustrated schematically in FIG. 6. The expansion through the FIMS orifice 102 is related to the fluid pressure ($P_f$), the pressure in the expansion region ($P_v$), the other parameters involving the nature of the gas, temperature, and the design of orifice 102. When an expansion occurs in a low pressure region or chamber 104 with a finite background pressure ($P_v$), the expanding gas in jet 100 will interact with the background gas producing a shock wave system. This includes barrel and reflected shock waves 110 as well as a shock wave 112 (the Mach disk) perpendicular to the jet axis 114. The Mach disk is created by the interaction of the supersonic jet 110 and the background gases of region 104. It is characterized by partial destruction of the directed jet and a transfer of collisional energy resulting in a redistribution of the directed kinetic energy of the jet among the various translational, vibrational and rotational modes. Thus, the Mach disk serves to heat and break up the solvent clusters formed during the expansion process. Experimentally, it has been observed that the extent of solvent cluster formation drops rapidly as pressure in the expansion region is increased. This pressure change moves the Mach disk closer to the nozzle, curtailing clustering of the solvent.

The distance from the orifice to the Mach disk may be estimated from experimental work (29,30) as 0.67 $D(P_f/P_v)^{1/2}$, where D is the orifice diameter. Thus, for typical conditions where $P_f=400$ atm, $P_v=1$ torr and $D=1$ $\mu$m the distance to the Mach disk is 0.4 mm. Accordingly, it is helpful to have sufficient background gas in the low pressure region to limit clustering of the solvent so that the solvent is not included in the film or powder. This requirement is most evident when operating under conditions close to those yielding two-phase systems. This requirement for collisional energy transfer with background gas is met in any practical enclosed vacuum system but may require additional heating of the chamber if operating near the two-phase region (see FIG. 4A).

The solvent clusters formed during the expansion of a dense gas result from adiabatic cooling in first stages of the expansion process. The extent of cluster formation is related to the fluid pressure, temperature, and the orifice dimensions. Theoretical methods for prediction of the precise extent of cluster formation are still inadequate. However, an empirical method of "corresponding jets" has been developed (29) which uses scaled parameters, and has been successfully employed. Randall and Wahrhaftig (30) have applied this method to the expansion of supercritical $CO_2$ and obtained the following empirical equation:

$$N=6\times10^{11}\times P_f^{1.44}\times D^{0.86}\times T^{-5.4}$$

for $P_f$ in torr, T in °K., D in mm and where N is the average number of molecules in a cluster and T is the supercritical fluid temperature. For the typical conditions noted above this leads to an average cluster size of approximately $1.6\times10^3$ molecules at 100° C. or a droplet diameter of about 30 Å. For a solute present in a 1.0 mole percent supercritical fluid solution, this corresponds to a solute cluster size of 16 molecules after loss or evaporation of the solvent (gas) molecules, assuming all solute molecules remain associated. For the laser drilled FIMS orifice, the dimensions are such that we expect somewhat of a delay in condensation resulting in a faster expansion and less clustering than calculated. More conventional nozzles or longer orifice designs would enhance solvent cluster formation.

Thus, the average clusters formed in the FIMS expansion process are more than $10^6$ to $10^9$ less massive than the droplets formed in liquid spray and nebulization methods. The small clusters formed in the FIMS process are expected to be rapidly broken up in or after the Mach disk due to the energy transfer process described above. The overall result of the FIMS process is to produce a gas spray or a spray of extremely small clusters incorporating the nonvolatile solute molecules. This conclusion is supported by our mass spectrometric observations which show no evidence of cluster formation in any of the supercritical systems studied to date (25,26).

Thus, the foregoing details of the FIMS process are relevant to the injector design, performance, and lifetime, a well as to the characteristics of the molecular spray and the extent of clustering or coagulation. The initial solvent clustering phenomena and any subsequent gas phase solute nucleation processes, are also directly relevant to film and powder characteristics as described hereinafter.

Film Deposition and Powder Formation

The FIMS process is the basis of this new thin film deposition and powder formation technique. The FIMS process allows the transfer of nominally nonvolatile species to the gas phase, from which deposition is expected to occur with high efficiency upon available surfaces.

However, while the FIMS process determines the rate of transfer to the gas phase, both the gas phase and substrate conditions have an effect upon the resulting film. The powder formation process also depends on both the FIMS process and the kinetics of the various gas phase processes which promote particle growth. The major gas phase processes include possible association with solvent molecules and possible nucleation of the film species (if the supercritical fluid concentration is sufficiently large). Important variable substrate parameters include distance from the FIMS injector, surface characteristics of the substrate, and temperature. Deposition efficiency also depends in varying degrees upon surface characteristics, pressure, translational energy associated with the molecular spray, and the nature of the particular species being deposited.

Apparatus

The viability of the FIMS concept for film deposition and powder formation has been demonstrated by the use of the apparatus shown in FIGS. 4, 4A, 5, and 5A. The supercritical fluid apparatus 210 utilizes a Varian 8500 high-pressure syringe pump 212 (8000 psi maximum pressure) and a constant-temperature oven 214 and transfer line 216 connected to an injection probe 226 including a restrictor for rapidly expanding the supercritical fluid into an expansion chamber 218. The expansion chamber is equipped with a pressure monitor in the form of a thermocouple gauge 220 and is pumped using a 10 cfm mechanical pump 222. A liquid nitrogen trap (not shown) is used to prevent most pump oil from back streaming. (However, the films produced did show impurities in several instances due to the presence of a fluorocarbon contaminant and trace impurities due to the pump oil, and high quality films free of such impurities should utilize either improved pumping devices or a significant flow of "clean" gas to prevent back diffusion of pump oils.) The initial configuration also required manual removal of a flange for sample substrate 224 placement prior to flange closure and chamber evacuation. The procedure is reversed for sample removal. Again an improved system would allow for masking of the substrate until the start of the desired exposure period, and would include interlocks for sample introduction and removal. In addition, means for substrate heating (see FIG. 4A) and sample movement (e.g., rotation) are also desirable for control of deposition conditions and to improve deposition rates (and film thicknesses) over large substrate areas. In addition, for certain powder or film products, it is appropriate to operate under ambient atmospheric conditions, thus greatly reducing the complexity of the necessary equipment. For ambient pressure deposition, one would simply need to maintain gas flow to remove the gas (solvent).

Figure 4A:
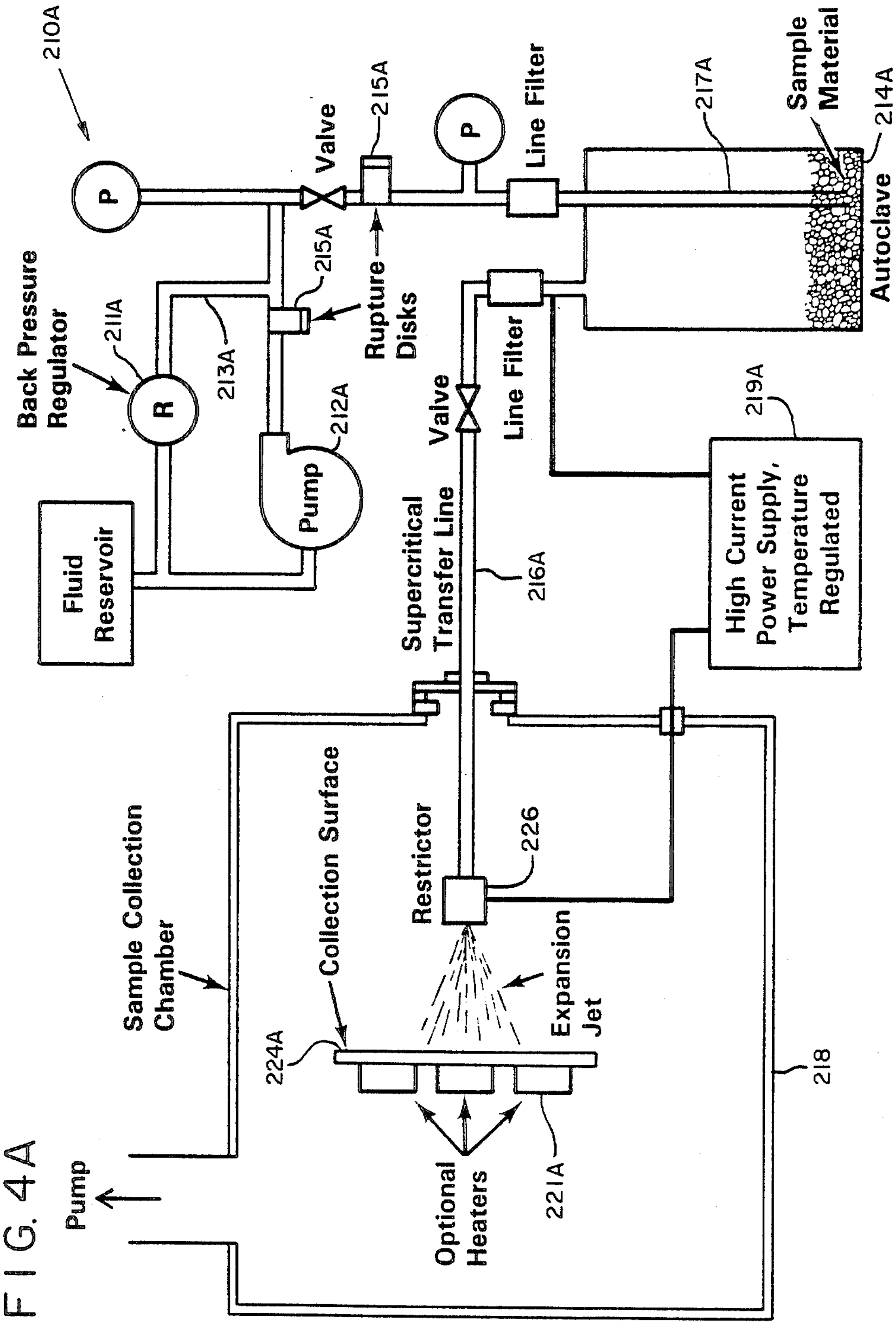
FIG. 4A is an alternate embodiment of the apparatus of FIG. 4.

An alternative, and presently preferred, FIMS deposition apparatus 210A is shown in FIG. 4A. This system utilizes a high pressure hydraulic piston pump 212A with a distancing piece (not shown) to prevent contamination of the pumped fluid by oil present in the air drive section. The pump is capable of maintaining 15,000 psi continuous pressure in the system. A back-pressure regulator 211A and rupture disks 213A in the outlet line are incorporated in the system in a feedback line 213A between the pump's intake and outlet lines to prevent overpressurization. The solid sample material is contained in a 280 ml high pressure autoclave 214A in which the high pressure input line 217A has been extended to the bottom to maximize dissolution of the sample. Temperature of the autoclave is maintained by an external band heater (not shown) and controlled using a thermocouple feedback. Heating of the transfer line 216A connecting the autoclave to the expansion nozzle 226 inside chamber 218 is achieved by applying the output from a temperature controlled high current, low voltage D.C. power supply 219A along its length. Heaters 221A are optionally mounted on the back of collection plate 224A.

Figure 12A:
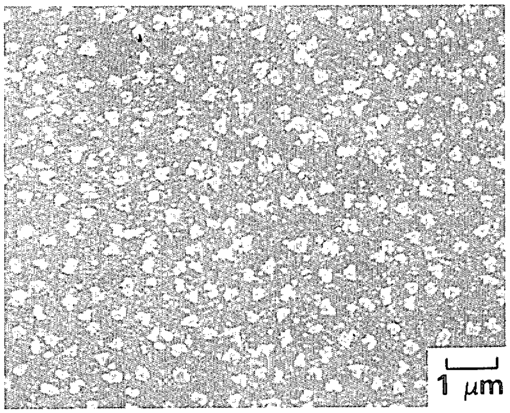
FIGS. 12A and 12B are photomicrographs showing examples of nonporous silica powders.
Figure 12B:
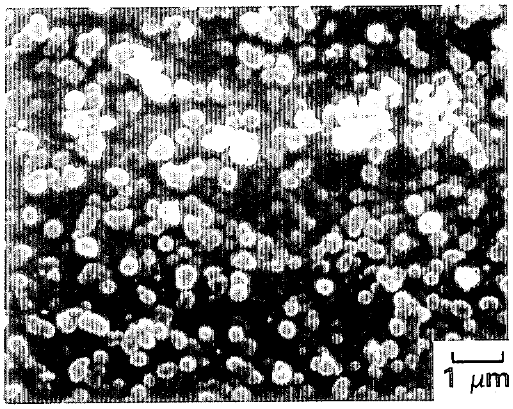
Figure 12C:
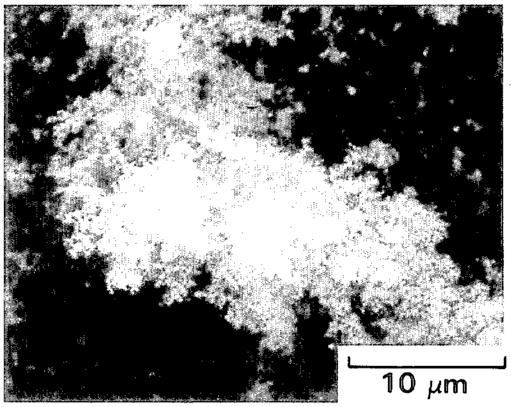
FIG. 12C is a photomicrograph of a highly porous (high surface area) powder produced by incorporating an ionic cosolute (potassium iodide) with the silica, showing an alternative mechanism to produce such products.

The mixed products discussed below in Example 5C and shown in FIG. 12C involve the formation of a mixed product in which both components are present in the solution autoclave. Alternatively, a simple modification of the apparatus shown in FIG. 4A may be made by connecting the transfer lines 216A from two independently heated autoclaves 217A at a tee before the nozzle such that the solutions are intimately mixed as supercritical fluids separately prior to the expansion. This modification is particularly useful when the two compounds to be combined have different solubilities in a common supercritical fluid (as in the case of $SiO_2$ and $GEO_2$ in water), or when the relative concentrations of two or more components in the FIMS product are to be manipulated. I have produced highly homogeneous mixed $SiO_2$-$GeO_2$ powders in this manner. As a further alternative, two separate autoclaves and tandem nozzles may be incorporated in parallel in the apparatus of FIG. 4A to mix the FIMS sprays at a point during the expansion or to produce mixed materials separately dissolved in incompatible solvents.

Operation under the high vacuum conditions in space would allow desirable conditions for both the powder and thin films processes since the gas phase solvent is rapidly removed. In addition, the gravity-free conditions available in space would allow the formation of fine particles having highly symmetric physical properties. In addition, any FIMS process system would benefit from a number of FIMS injectors operating in tandem to produce more uniform production of powders or films or to inject different materials to produce powder and films of variable chemical composition.

Several FIMS probes have been designed and tested in this process. One design, illustrated in FIG. 5, consists of a heated probe 226 (ordinarily maintained at the same temperature as the oven and transfer line) and a pressure restrictor consisting of a laser-drilled orifice in a 50 to 250 μm thick stainless steel disc 228. A small tin gasket is used to make a tight seal between the probe tip and the pressure restrictor, resulting in a dead volume estimated to be on the order of 0.01 microliter. Good results have been obtained with laser-drilled orifices in ν250 μm (0.25 mm) thick stainless steel. The orifice is typically in the 1–4 μm diameter size range although this range is primarily determined by the desired flow rate. The actual orifice dimensions are variable due to the laser drilling process. A second design (FIG. **5*a*) of probe 226*a* is similar to that of FIG. 5, but terminates in a capillary restriction obtained, for example, by carefully crimping the terminal 0.1–0.5 mm of platinum-iridium tubing 230**. This design provides the desired flow rate as well as an effectively zero dead volume, but more sporadic success than the laser-drilled orifice. Another restrictor (not shown) is made by soldering a short length (<1 cm) of tubing having a very small inside diameter (<50–100 μm for a small system but potentially much larger for large scale film deposition or high powder formation rates) inside of tubing with a much larger inside diameter so that it acts as an orifice or nozzle.

The important point is to enable the injection process to be sufficiently fast so that material has insufficient time to precipitate and plug the orifice. Thus a 10 cm length of 10 μm I.D. tubing plugs very rapidly—the pressure drops along the capillary and at some point the solute precipitates and collects, ultimately plugging the tube. It is important to minimize any precipitation by making the pressure drop as rapid as possible. A simple calculation shows that the fluid moves through a restrictor of 100 μm in length in $<10^{-6}$ seconds.

Very concentrated (saturated) solutions can also be handled with reduced probability of plugging by adjusting the conditions in the probe so that the solvating power of the fluid is increased just before injection. This can be done in many cases by simply operating at a slightly lower or higher temperature, where the solubility is larger, and depending upon pressure as indicated in FIG. 2. Also, probe temperature can be manipulated to vary solution temperature, as mentioned above, relative to an estimated or experimentally-determined two-phase temperature "point." This point is a narrow temperature range (e.g., 10°–20° C. wide) approximating a threshold at a given pressure (see FIG. 3B) between one-phase and two-phase characteristics of the solvent in the supercritical solution. When temperature is above such point, the constituents transfer directly to the gas phase. Just below such point, a portion of the solvent is believed to pass briefly through a solute-supersaturated liquid phase before the remaining solvent vaporizes.

EXAMPLES 1 AND 2

The first two systems chosen for demonstration involved deposition of polystyrene films on platinum and fused silica, and deposition of silica on platinum and glass. The supercritical solution for polystyrene involved a 0.1% solution in a pentane −2% cyclohexanol solution. Supercritical water containing ~0.02% $SiO_2$ was used for the silica deposition. In both cases the substrate was at ambient temperatures and the deposition pressure was typically approximately 1 torr, although some experiments described hereinafter were conducted under atmospheric pressure. The films produced ranged from having a nearly featureless and apparently amorphous structure to those with a distinct crystalline structure. It should be noted that, as in chemical vapor deposition, control over film characteristics—amorphous, polycrystalline and even epitaxial in some instances—is obtained by control of the substrate surface and temperature). Relatively even deposition was obtained over the small surfaces (~4 $cm^2$).

Fourier transform infrared analysis of the polystyrene films on fused silica (not shown) did not show detectable amounts of the cyclohexanol solvent. However, the silica films did show evidence of fluorocarbon impurities possibly due to the sample cell. Analysis of the films indicated a thickness of approximately 0.5 μm for polystyrene and 2800 Å for silica for five minute deposition periods. Much greater or smaller formation rates can be obtained by adjustment of parameters noted previously and the use of multiple FIMS injectors.

These limited studies also indicated that more concentrated solutions with long distances to the deposition surface could result in substantial nucleation and coagulation for some materials. For example, for silica, it was possible to generate an extremely fine powder having a complex structure and an average particle size <0.1 μm. Using a saturated polystyrene solution produced particles (not shown) as large as 0.3 μm with an extremely narrow size distribution.

The range of surface structures produced for the silica deposition studies show an even wider range of surface characteristics. FIGS. 7A, 7B, 7C and 7D give scanning electron photomicrographs obtained for silica film deposition on glass surfaces under the range of conditions listed in Table 2 below.

TABLE 2

Solute: Silica Solvent: Water
Expansion region at ambient temperature for 5–10 minutes exposed.

| | Supercritical Fluid | | | FIMS Conditions | |
|---|---|---|---|---|---|
| | Silica Conc. Est. from Solubility Data | Temp | Pressure (atm) | Flow Rate | Pressure |
| Film | | | | | |
| A | 0.01% | 450° C. | 400 | 40 microliter/min | 0.5 torr |
| B | 0.02% | 400° C. | 450 | 40–70 microliter/min | 0.5 torr |
| C | 0.04% | 490° C. | 400 | 150 microliter/min | 0.6 torr |
| D* | 0.04% | 450° C. | 400 | 250 microliter/min | 0.9 torr |
| Powder | | | | | |
| A | 0.02% | 520° C. | 450 | 100 microliter/min | 1 atm (760 torr) |
| B* | 0.05% | 450° C. | 400 | 90 microliter/min | 0.5 torr |
| C | 0.04% | 450° C. | 400 | 300 microliter/min | 1.2 torr |

*Contained fluorocarbon contaminant

Figure 7A:
FIGS. 7A, 7B, 7C and 7D are photomicrographs showing four different examples of supercritical fluid injection molecular spray-deposited silica surfaces in accordance with the invention.
Figure 7B:
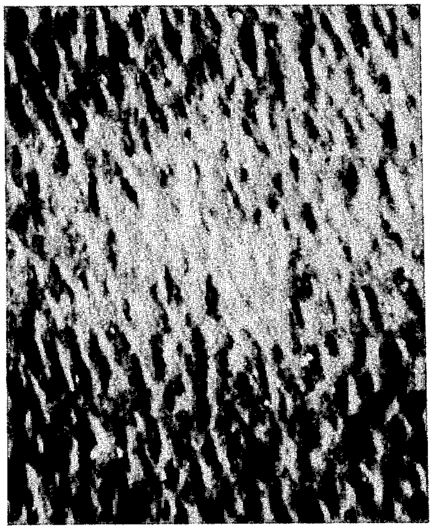
Figure 7C:
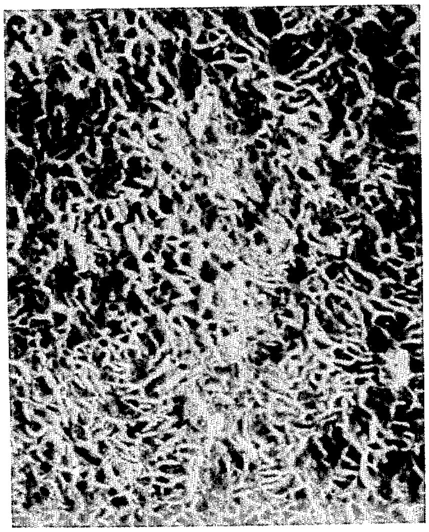
Figure 7D:
Figure 8A:
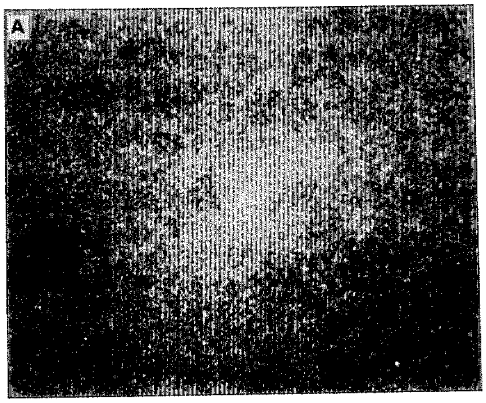
FIGS. 8A, 8B and 8C are low magnification photomicrographs of three examples of supercritical fluid injection molecular spray-formed silica particles or powders in accordance with the invention.
Figure 8B:
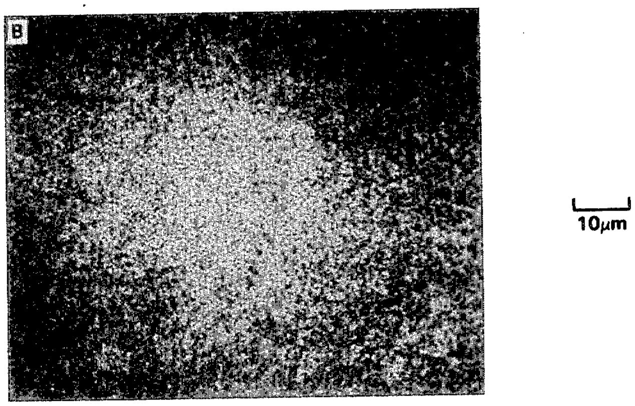
Figure 8C:
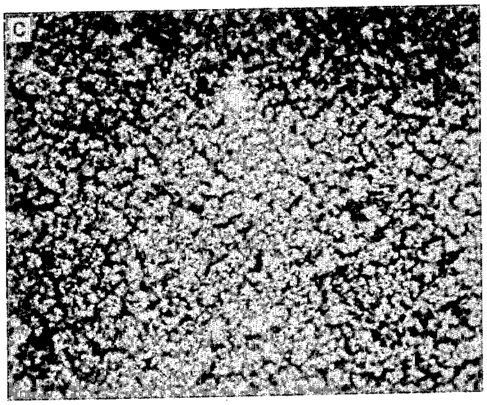
Figure 9A:
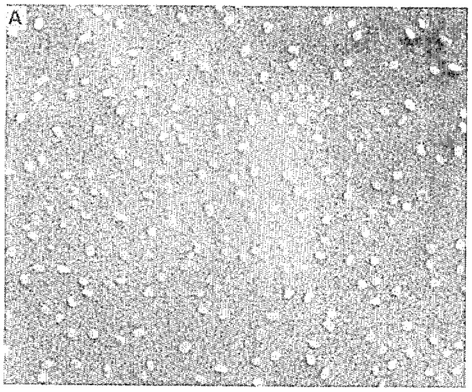
FIGS. 9A, 9B and 9C are ten times magnification photomicrographs of the subject matter of FIGS. 8A, 8B and 8C, respectively.
Figure 9B:
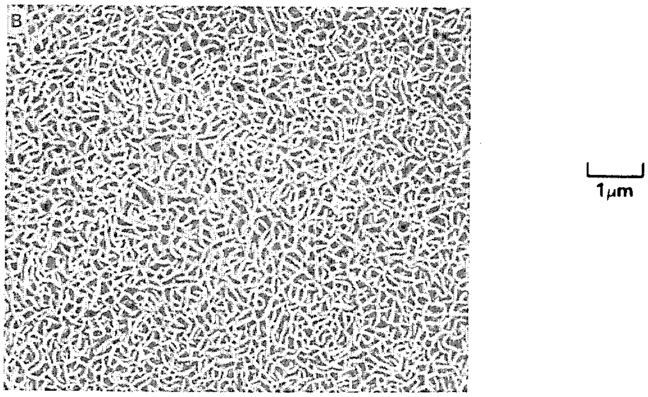
Figure 9C:
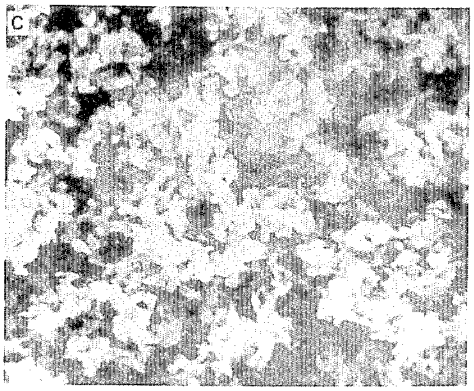

The photomicrographs show that the deposited films range from relatively smooth and uniform (FIGS. 7A and 7B) to complex and having a large surface area (FIGS. 7C and 7D). FIG. 7A shows a very smooth film surface having an average granularity on the order of 0.01 to 0.1 μm. FIG. 7B shows a regular, anisotropically-cobbled or striated film surface having a granularity of about 0.5 to 1.0 μm lengthwise and about 0.2 to 0.3 μm transversely of the surface texture. The surface of FIG. 7C is produced using a higher deposition rate than that of FIG. 7A, i.e., a higher silica concentration. FIG. 7C shows a finely intertwined matted strand-like porous surface or "crystal-like" structures which are apparently formed subsequent to deposition coating the individual strands having a width of about 0.05 to 0.1 μm and a length of about 0.2 to 0.5 μm. FIG. 7D shows a surface like that of FIG. 7C but more coarsely textured, with a strand width of about 0.1 to 0.2 μm and length of about 0.6 to 1.5 μm. Similarly, FIGS. 8A, 8B, 8C and 9A, 9B and 9C show powders produced under conditions where nucleation and coagulation are increased. FIG. 9A shows a fine powder of nearly spherical or ovoid particles having an average diameter of about 0.1 to 0.2 μm. FIG. 9B shows a fine powder of strand-like particles or short fibers of about 0.1 to 0.2 μm diameter for an aspect ratio (length/diameter) on the order of 20–30. FIG. 9C shows a powder of porous, amorphous particles of about 0.5 to 2.0 μm dimensions. It should be noted that different FIMS restrictors were utilized for these examples. The resulting products are not expected to be precisely reproducible but are representative of the range of films or powders which can be produced using the FIMS process. In addition, different solutes would be expected to change the physical properties of the resulting films and powders. For example, the powder of FIG. 9B and the film of FIG. 7D were both determined to contain a fluorocarbon contaminant.

In general, high injection or flow rates produce a more granular film surface or larger powder sizes, as so higher solute concentrations, and higher expansion chamber pressures. To a certain extent, orifice length and shape will also affect granularity. The deposition rate also increases as the product of solute concentration and the flow rate increase. Solute concentration is a more important determinant of granularity than flow rate. Therefore, to alter granularity it is preferable to vary the solute concentration and to alter deposition rate it is preferable to vary flow rate.

EXAMPLES 3, 4 AND 5

Figure 10A:
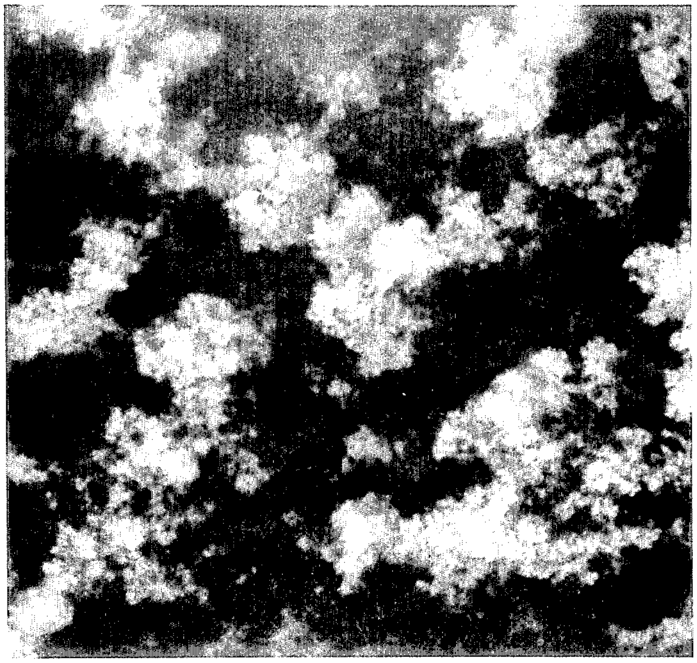
FIGS. 10A and 10B are photomicrographs showing examples of microporous and nonporous germanium oxide powders made by varying pre-expansion temperature of the solution.
Figure 10B:
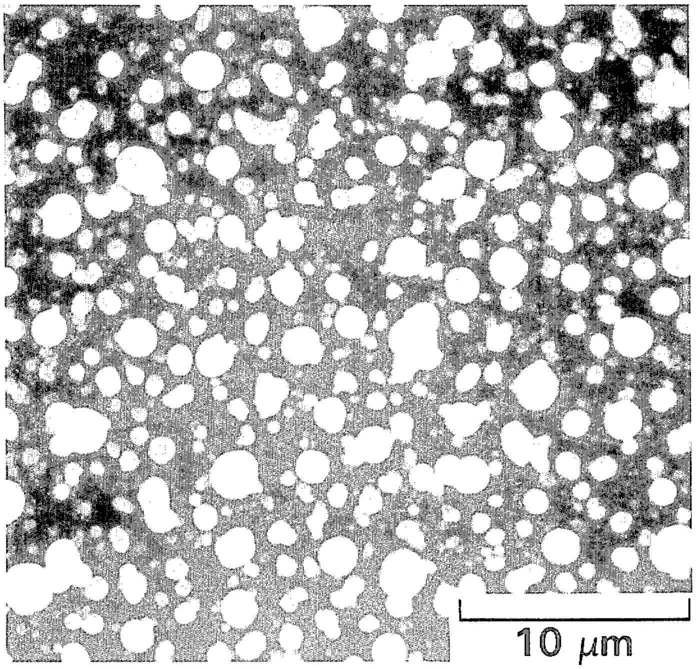
Figure 11A:
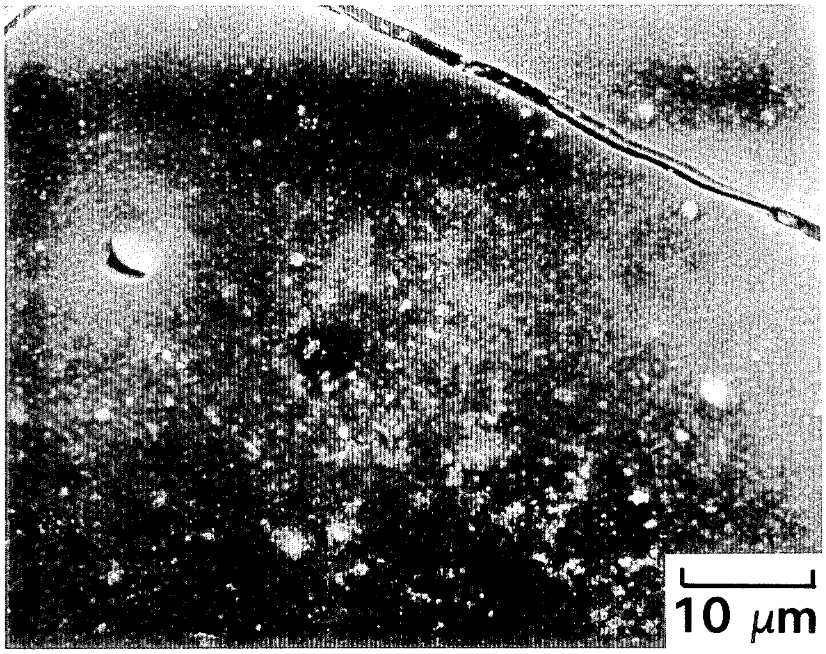
FIGS. 11A and 11B are different magnification photomicrographs showing an example of thick-film silica surface coatings made by maintaining the pre-expansion temperature of the supercritical solution below the two-phase solution temperature.
Figure 11B:
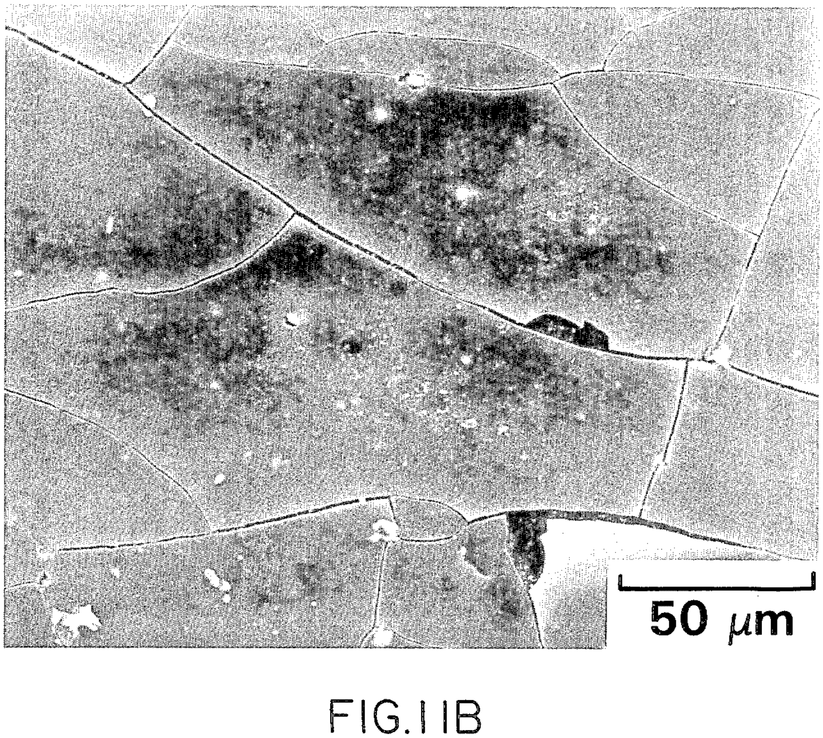

FIGS. 10A and 10B illustrate the range of germanium oxide powders that can be made by varying solution temperature about the two-phase point of water for a given pressure. FIGS. 11A and 11B show, at different magnifications, a silica thick film made by deposition of a FIMS molecular spray from a supercritical solution having a temperature below the two-phase point of water. FIGS. 12A, 12B and 12C further illustrate the range of size and structural variation of silica powders (and a silica-potassium iodide mixture for FIG. 12C) produced at different concentrations of silica in the supercritical solution.

Except as noted below in Table 3, all other parameters of the FIMS process remaind constant in each example.

TABLE 3

Expansion region at ambient temperature for five minutes exposed.

| | Supercritical Fluid | | | FIMS Conditions | |
|---|---|---|---|---|---|
| Product | Concentration | Temp | Pressure (atm) | Flow Rate | Pressure (torr) |
| Example 3 - Solute: Germanium oxide | | | | Solvent: Water | |
| Powder | | | | | |
| A | 0.1% | 475° C. | 600 | 40 ml/min | 760 |
| B | 0.1% | 445° C. | 600 | 40 ml/min | 760 |
| Example 4 - Solute: Silica | | | | Solvent: Water | |
| Film | | | | | |
| | 0.04% | 450° C. | 600 | 40 ml/min | 10 |
| Example 5 - Solute: Silica | | | | Solvent: Water | |
| Powder | | | | | |
| A | <0.01% | 425° C. | 600 | 40 ml/min | 10 |
| B | 0.1% | 475° C. | 600 | 40 ml/min | 10 |
| C* | 0.1% | 465° C. | 600 | 40 ml/min | 10 |

Silica/potassium iodide mixture

At 475° C. (Example 3A), and at higher solution temperatures (typically 500° C.–600° C.), depending upon the system, a fine (3–5 μm envelope diameter) microporous (highly agglomerated) powder is obtained. At 445° C. (Example 3B), and lower temperatures, a nonporous nearly spherical particles of minimal surface area are produced. The two temperatures correspond to situations above and below the two-phase temperature of the solution, as illustrated in FIG. 3A by dashed lines 51 and 50, respectively. These observations include some uncertainty about fluid temperature at the instant of expansion (±20° C.). The fact that the temperatures of the solutions in the two modes of operation are lower than the two temperatures indicated in FIG. 3A is due to the modification of the thermodynamic characteristics of the solvent by the solute. Regardless of such modification, there remains a threshold between the two modes that is related to the thermodynamic characteristics of the solvent and which enables the character of the resultant powder or film to be controlled by manipulating solution temperature.

As shown in FIG. 10A, the powder produced at the higher temperature has an extremely high surface area, resulting from a filamentous or sponge-like structure probably due to agglomeration of very small (<0.02 μm) particles. Powders of such a structure are useful as catalysts and possibly for packed-column chromatography.

FIG. 10B shows a case where fine spherical powders are formed, having a much lower, nearly minimal surface area. The relatively wide size distribution (0.5–3 μm) indicates a transitory liquid state during the expansion process and some particle growth mechanism while the molecular spray is still in a liquid form and perhaps producing the wider particle size distribution seen in this example. This corresponds to formation of a two-phase region during the expansion process, in which the molecular spray includes highly saturated micro-droplets of solution which remain briefly in liquid form.

Highly porous film products (not shown) typical of the higher temperature mode of operation associated with FIG. 10A, have also been formed with silica from supercritical water.

Referring to FIGS. 11A and 11B, a thick film formation mode (Example 4) also exists at lower supercritical solution temperatures. This film is substantially nonporous, as illustrated in FIGS. 11A and 11B, the film having been deposited on a millipore filter. The filter has been flexed to cause cracks in the silica film, clearly showing the thick (1–5 μm) continuous (i.e., nonporous) nature of the film. The nonporosity of products formed in the low temperature mode has been further confirmed by BET surface area measurements for the corresponding powders. There is also a variation in this mode of operation, in which thick, nonporous films have been produced with spherical particles embedded throughout the surface. The films produced in this mode have a "peanut brittle" appearance. This variation appears to a slight extent in FIG. 11B. This structure may be useful in producing certain optical characteristics.

FIGS. 12A and 12B (Examples 5A and 5B) show silica powders in two different size ranges, formed by the lower temperature mode of the process, while further varying the concentration of silica in the supercritical solution. This example demonstrates a factor of 5 difference in particle diameter for a factor of approximately 10 change in solute concentration. FIG. 12B illustrates the narrow size distribution that can be obtained for submicron particle sizes. Particle diameter is about 0.05–0.1 μm for the lower concentrations of silica and 0.2–0.3 μm for the higher concentrations. FIG. 12C (Example 5C) shows highly porous particles produced from a silica/potassium iodide mixture, in the higher temperature mode of operation and at higher concentration levels. The example of FIG. 12C, and other tests I have conducted, demonstrate that various compounds can be mixed in the formation of powders and films using the FIMS process. The compounds must be soluble in common giving a single phase in the selected supercritical solution. Analysis of the products formed demonstrates that the mixtures are distributed substantially uniformly throughout the product. In the higher temperature mode of operation, a nonequilibrium product is formed, as a result of the transfer of the solute directly from the supercritical solution to a solid state. Accordingly, it is expected that the product is also highly homogeneous down to the molecular level. (Although subsequent processes on the molecular level which are well known can cause surface segregation or crystal growth depending upon material and temperature.) The powder of FIG. 12C is an extremely high surface area product, showing a significant amount of agglomeration of smaller particles. All of these examples were obtained using a 5 mm long, 60 μm inside diameter nozzle, and a spacing of 10–15 cm. from the deposition or collection surface.

Having illustrated and described the principles of my invention in several embodiments, with a number of examples illustrating variations thereof, it should be apparent to those skilled in the art that the invention can be modified in arrangement and detail without departing from such principles. Accordingly, I claim all modifications coming within the spirit and scope of the following claims.

REFERENCES

1. Schneider, G. M., E. Stahl and G. Wilke, editors, 1980, "Extraction with Supercritical Gases," Verlag Chemie, Deerfield Beach, Fla.
2. Gouw, T. H., R. E. Jentoft, *Adv. Chromatog.*, 13, 1–40 (1975).
3. Wassen, u. Van I. Swaid and G. M. Schneider, *Agenw. Chem. Int. Ed. Eng.*, 19, 575–587 (1980).
4. Giddings, J. C., M. N. Myers, L. McLaren and R. A. Keller, *Science*, 162, 67–73 (1968).
5. Irani, C. A., and E. W. Funk, in: *Recent Developments in Separation Science*, N. N. Li (Ed.), CRC Press, Cleveland, p. 171 (1977).
6. Schindler, H. D., J. M. Chen, and J. D. Potts, "Integrated Two Stage Liquefaction Topical Technical Progress Report Completion of Indiana V Program," NTIS 14804-Q7 (1982).
7. Prausnitz, J. M., *Molecular Thermodynamics of Fluid Phase Equilibrium*, Prentice-Hall, Englewood Cliffs (1969).
8. Oellrich, L., U. Plocker, J. M. Prausnitz and H. Knapp, *Chem. Ing. Tech.*, 49, 955 (1977).
9. Prausnitz, J. M., *Inst. Chem. Eng. Trans.*, 59, 3 (1981).
10. Peter, S., *Ber Bunsenges. Phys. Chem.*, 81, 950 (1977).
11. Johnson, K. P., and C. A. Eckert, *Amer. Inst. Chem. Eng.*, 27, 773 (1981).
12. Franck, E. U., *Berichte Bunsen-Gesellschaft*, 76, 341 (1972).
13. Hamann, S. D. and M. Liuron, *Trans. Far. Soc.*, 65, 2186 (1968).
14. Kleintjens, L. A., and R. Koringsveld, *J. Electrochem. Soc.*, 127, 2352 (1980).
15. Kleitjens, L. A., and R. Koringsveld, *Sep. Sci. Tech.*, 17, 215 (1982).
16. Vezzetti, D. J., *J. Chem. Phys.*, 77, 1512 (1982).
17. Giddings, J. C., M. N. Myers and J. W. King, *J. Chromatogr. Sci.*, 7, 276–283 (1969).
18. Bowman, L. M., Ph.D. Thesis, University of Utah (1976).
19. Barton, A. F. M., *Chem. Rev.*, 731 (1975).
20. Hoy, K. L., *J. Paint Technol.*, 42, 76 (1970).
21. Konstam, A. H. and Feairheller, *A. I. Ch. E. Journal*, 16, 837 (1970).
22. P. Hubert and O. V. Vitzthum, "Fluid Extraction of Hops, Spices and Tobacco with Supercritical Gases in Extraction with Supercritical Gases," edited by G. M. Schneider and E. Stahl and G. Wilke, Verlag Chemi Weinheim, 1980, pages 26–43.
23. "Assessment of Critical Fluid Extractions in the Process Industries," Critical Systems Incorporated, A. D. Little, Cambridge, Mass. Ecut Biocatholysis, U.S. Department of Energy, JPO-9950-793, April, 1982.
24. Smith, R. D., W. D. Felix, J. C. Fjeldsted and M. L. Lee, *Anal. Chem.*, 54, 1883 (1982).
25. Smith R. D., J. C. Fjeldsted, and M. L. Lee, *J. Chromatog.*, 247, 231–243 (1982).
26. Smith, R. D. and H. R. Udseth, *Biomed. Mass Spectrom* (1983).
27. Smith, R. D. and H. R. Udseth, *Fuel*, 62, 466–468 (1983).
28. Smith, R. D. and H. R. Udseth, *Sep. Sci. Tech.* 18, 245 (1983).
29. Hagena, O. F., and W. Obert, *J. Chem. Phys.*, 56, 1793 (1972).
30. Randall, L. G. and A. L. Wahrahaftig, *Rev. Sci. Instrum.*, 52, 1283–1295 (1981).

I claim:

1. A method for depositing of a film of solid material, on a surface, comprising:

forming a supercritical solution including a supercritical fluid solvent and a dissolved solute of a solid material;

rapidly expanding the supercritical solution through an orifice of a predetermined length and diameter to produce a molecular spray of the material and solvent;

directing the molecular spray against a surface to deposit a film of the solid material thereon; and selecting and maintaining a temperature of the supercritical solution in relation to a two-phase pre-expansion temperature of the solvent to control a liquid solvent content of the molecular spray and thereby determine a porosity characteristic of the film.

2. A method according to claim 1 including maintaining the supercritical solution at a temperature at which the solvent entirely vaporizes immediately upon expansion through said orifice, whereby the solid material is deposited as a thin film.

3. A method according to claim 1 including maintaining the supercritical solution at a temperature at which the molecular spray includes a portion of the solvent in liquid form upon expansion through said orifice, whereby the solid material is deposited as a thick film.

4. A method according to claim 3 in which the spray includes a saturated solution of the solute and liquid solvent.

5. A method according to claim 1 including varying the solute concentration in order to vary the granularity of the film deposited on the surface.

6. A method for forming a fine powder of a solid material, comprising:

forming a supercritical solution including a supercritical fluid solvent and a dissolved solute of a solid material;

rapidly expanding the supercritical solution through an orifice of a predetermined length and diameter to produce a particulate spray of the material and vaporized solvent;

discharging the spray into a low pressure region to form a powder of the solid material therein; and selecting and maintaining a temperature of the supercritical solution in relation to a two-phase expansion temperature of the solvent to control a liquid solvent content of the molecular spray and thereby determine a porosity characteristic of the powder.

7. A method according to claim 1 including maintaining the supercritical solution at a temperature at which the solvent entirely vaporizes immediately upon expansion through said orifice, whereby the solid material is deposited as a high surface area powder.

8. A method according to claim 6 including maintaining the supercritical solution at a temperature at which the molecular spray includes a portion of the solvent in liquid form upon expansion through said orifice, whereby the solid material is deposited as a substantially nonporous powder.

9. A method according to claim 8 in which the spray includes a saturated solution of the solute and liquid solvent.

10. A method according to claim 6 in which supercritical fluid solute concentration is increased to increase the particle size of the powder.

11. A method for forming a solid material into one of a thin film and a powder, comprising:

forming a supercritical solution containing a supercritical fluid solvent and a dissolved solute of the solid material in a predetermined concentration and at an elevated pressure;

discharging the supercritical solution through a short orifice into a region of lower pressure so as to rapidly expand the solution to produce a molecular spray of the solid material and solvent;

varying at least one of the elevated pressure, the solute concentration, and the pressure of the low pressure region so as to control one of the rate of deposition of solute and the extent of nucleation of molecules of the solute in the low pressure region; and varying the solution temperature to control porosity of the film or powder.

12. A method according to claim 11 in which forming said supercritical solution includes mixing at least two solid compounds to form the solute, whereby the product includes a substantially uniform distribution of the two compounds.

13. A method according to claim 12 in which one of the compounds is a salt.

14. A method for forming a solid material into one of a thin film and a powder, comprising:

selecting a solvent having, in a liquid phase, a limited solubility of said solid material and, in a supercritical fluid state, an increased solubility of the solid material;

forming a supercritical solution containing the solvent in a supercritical fluid state and a dissolved solute of the solid material in a predetermined concentration and at an elevated pressure;

discharging the supercritical solution through a common, short orifice into a region of lower pressure so as to rapidly expand the solution to produce a molecular spray of the solid material and solvent; and varying at least one of the elevated pressure, the solute concentration, and the pressure of the low pressure region so as to control one of the rate of deposition of solute and the extent of nucleation of molecules of the solute in the low pressure region.

15. A method according to claim 14 including varying the solution temperature to control the amount of liquid phase solvent included in said molecular spray.

16. A powder product formed by discharging a supercritical solution of a supercritical fluid solvent and a dissolved solute of a mixture of effective amounts of a solid inorganic and a polymeric material as a particulate spray into a low pressure region, said powder product comprising strand-like particles or fibers of said mixture wherein the inorganic and polymeric materials are mixed at a molecular level.

17. A product according to claim 16 in which the particles or fibers have a diameter of less than 0.2 μm and a narrow size distribution in the range of one half to one times said diameter.

18. A product according to claim 16 in which the solid inorganic material is silica and the polymeric material is a fluorinated hydrocarbon.

19. A powder product formed by discharging a supercritical solution of a supercritical fluid solvent and a dissolved solute of a mixture of effective amounts of a solid, inorganic material and a metal salt, soluble in common in said supercritical fluid solvent, as a particulate spray into a low pressure region, said powder product comprising microporous amorphous particles of said mixture wherein the inorganic material and metal salt are mixed at a molecular level.

20. A powder product according to claim 19 in which the solid, inorganic material includes at least one of $SiO_2$ and $GeO_2$.

21. A powder product according to claim 19 in which the microporous amorphous structure of the particles is defined by a filamentous agglomeration of subparticles of said mixture in which the subparticles are of a diameter less than about 0.02 μm.

* * * * *